(12) United States Patent
Beck et al.

(10) Patent No.: US 12,337,931 B2
(45) Date of Patent: Jun. 24, 2025

(54) BOTTOM BRACKET GEAR MECHANISM OF PLANETARY DESIGN FOR A BICYCLE OR A PEDELEC

(71) Applicant: ZF Friedrichshafen AG, Friedrichshafen (DE)

(72) Inventors: Stefan Beck, Eriskirch (DE); Michael Wechs, Weißensberg (DE); Fabian Kutter, Kressbronn (DE); Thomas Martin, Weissensberg (DE); Mladjan Radic, Lonsee (DE); Thomas Riedisser, Sigmarszell (DE); Hagen Doepfert, Lindau (DE)

(73) Assignee: ZF Friedrichshafen AG, Friedrichshafen (DE)

(*) Notice: Subject to any disclaimer, the term of this patent is extended or adjusted under 35 U.S.C. 154(b) by 0 days.

(21) Appl. No.: 18/666,214

(22) Filed: May 16, 2024

(65) Prior Publication Data

US 2024/0383571 A1 Nov. 21, 2024

(30) Foreign Application Priority Data

May 17, 2023 (DE) .......................... 102023204595.8

(51) Int. Cl.
*B62M 11/18* (2006.01)
*B62M 6/55* (2010.01)
(Continued)

(52) U.S. Cl.
CPC ............ *B62M 11/145* (2013.01); *B62M 6/55* (2013.01); *B62M 11/18* (2013.01); *B62J 45/411* (2020.02); *B62M 6/50* (2013.01)

(58) Field of Classification Search
CPC ...... B62M 11/145; B62M 6/55; B62M 11/18; B62M 6/50; B62J 45/411
See application file for complete search history.

(56) References Cited

U.S. PATENT DOCUMENTS 11,261,943 B2   3/2022 Ziemer et al.

FOREIGN PATENT DOCUMENTS

DE   102016217154 A1 *  3/2018  .......... B62M 11/145
DE   102018208380 A1 * 11/2019  ............ B62M 11/14
(Continued)

OTHER PUBLICATIONS

German Search Report for Application No. 102023204595.8 dated Jan. 17, 2024.
(Continued)

*Primary Examiner* — Justin Holmes
(74) *Attorney, Agent, or Firm* — Dority & Manning, P.A.

(57) ABSTRACT

A bottom bracket gear mechanism for a bicycle or a pedelec includes a gear mechanism shifting group in which a second element of the first gear set is connected to a first shaft, a third element of the first gear set is connected via a fourth shaft to a second element of the second gear set, and a first element of the first gear set is connected to a fifth shaft. A first element of the second gear set is fixable via a third shaft and the second shifting element. The third shaft is connectable to the fifth shaft via the sixth shifting element. The third element of the second gear set is fixable via a second shaft and via the first shifting element. The second shaft is connectable to the first shaft via the fifth shifting element.

20 Claims, 7 Drawing Sheets

(51) Int. Cl.
*B62M 11/14* (2006.01)
*B62J 45/411* (2020.01)
*B62M 6/50* (2010.01)

(56) References Cited

FOREIGN PATENT DOCUMENTS

| | | |
|---|---|---|
| DE | 102019220043 A1 | 6/2021 |
| DE | 102021204634 B3 | 8/2022 |
| DE | 102021212513 A1 | 2/2023 |
| DE | 102021209258 A1 | 3/2023 |
| DE | 102022209143 B3 | 12/2023 |
| WO | WO-2018108490 A1 * 6/2018 .......... B62M 11/145 |
| WO | WO2019228724 A1 | 12/2019 |

OTHER PUBLICATIONS

European Search Report for Application No. EP24176166 Dated Sep. 20, 2024.

* cited by examiner

| Gear | Engaged Shifting Elements | | | |
|---|---|---|---|---|
| | B1 | B2 | K1 | K2 |
| V1 |  |  | X | X |
| V2 |  | X | X |  |
| V3 | X |  |  | X |
| V4 | X | X |  |  |

| Gear | Engaged Shifting Elements | | | | | | | |
|---|---|---|---|---|---|---|---|---|
| | B1 | B2 | B3 | B4 | K1 | K2 | K3 | K4 |
| G1 | | | | | X | X | X | X |
| G2 | | | X | | X | X | | X |
| G3 | | | | X | X | X | X | |
| G4 | | | X | X | X | X | | |
| G5 | | X | | | X | | X | X |
| G6 | | X | X | | X | | | X |
| G7 | | X | | X | X | | X | |
| G8 | | X | X | X | X | | | |
| G9 | X | | | | | X | X | X |
| G10 | X | | X | | | X | | X |
| G11 | X | | | X | | X | X | |
| G12 | X | | X | X | | X | | |
| G13 | X | X | | | | | X | X |
| G14 | X | X | X | | | | | X |
| G15 | X | X | | X | | | X | |
| G16 | X | X | X | X | | | | |

BOTTOM BRACKET GEAR MECHANISM OF PLANETARY DESIGN FOR A BICYCLE OR A PEDELEC

CROSS-REFERENCE TO RELATED APPLICATION

The present application is related and has right of priority to German Patent Application No. 10 2023 204 595.8 filed on May 17, 2023, the entirety of which is incorporated by reference for all purposes.

FIELD OF THE INVENTION

The present invention relates generally to a bottom bracket gear mechanism of planetary design for a bicycle or a pedelec, the bottom bracket gear mechanism having a gear mechanism input shaft as drive, a gear mechanism output shaft as output, a multi-step main gear mechanism, and at least one gear mechanism shifting group. Furthermore, the invention relates generally to a bicycle or pedelec with the bottom bracket gear mechanism.

BACKGROUND

For example, document DE 10 2018 208 380 A1 has disclosed a 16-gear bottom bracket gear mechanism of planetary design for a bicycle or a pedelec with a four-gear main gear mechanism which is assigned a front-mounted gear set and a rear-mounted gear set each with two gear stages.

SUMMARY OF THE INVENTION

The present invention provides a bottom bracket gear mechanism and a bicycle or pedelec with such bottom bracket gear mechanism, which have as little structural complexity as possible with properties which are improved in comparison with the prior art.

Therefore, a bottom bracket gear mechanism of planetary design for a bicycle or a pedelec is proposed, with a gear mechanism input shaft as a drive, a gear mechanism output shaft as an output, a multi-step main gear mechanism, and at least one gear mechanism shifting group. The gear mechanism shifting group has two planetary gear sets, including a first planetary gear set and a second planetary gear set, and four shifting elements, including a first shifting element, a second shifting element, a fifth shifting element, and a sixth shifting element. A second element of the first planetary gear set is connected to a first shaft, a third element of the first planetary gear set is connected via a fourth shaft to a second element of the second planetary gear set, and a first element of the first planetary gear set is connected to a fifth shaft. A first element of the second planetary gear set is fixable via a third shaft and via the second shifting element which is a brake. The third shaft is connectable to the fifth shaft via the sixth shifting element which is a clutch or freewheel. The third element of the second planetary gear set is fixable via a second shaft and via the first shifting element which is a brake. The second shaft is connectable to the first shaft via the fifth shifting element which is a clutch or freewheel.

By the above-described attachment of the gear mechanism shifting group, a particularly simple and compact construction in the bottom bracket gear mechanism is realized in the case of the proposed bottom bracket gear mechanism with only two provided planetary gear sets and only four provided shifting elements in the case of the gear mechanism shifting group. This is accompanied by particularly low component loads and an advantageously high degree of toothing efficiency on account of the geometric transmission ratio in the case of the bottom bracket gear mechanism.

For the mechanical connection of elements of the two planetary gear sets in the case of the gear mechanism shifting group, only five further shafts or shaft-like elements are preferably used in addition to drive and output, where the term "shaft" is not to be understood as exclusively meaning a cylindrical, rotatably mounted machine element for the transmission of torques, but rather general connecting elements which connect the individual gear set elements to one another for the transmission of torque are also to be understood by this.

The axial sequence of main gear mechanism and gear mechanism shifting group are swappable in the case of the proposed bottom bracket gear mechanism. Accordingly, the gear mechanism shifting group is connected upstream or downstream of the main gear mechanism between the gear mechanism input shaft and the gear mechanism output shaft. In the case of the gear mechanism shifting group being connected upstream, a pedal crank, connected to the gear mechanism input shaft, of the bottom bracket gear mechanism is connected to the first shaft and the gear mechanism input shaft of the gear mechanism shifting group, and the fifth shaft of the gear mechanism shifting group is connected on the input side to the multi-step main gear mechanism. It is possible that the gear mechanism input shaft and the first shaft are configured in one part or in multiple parts. In the case of the gear mechanism shifting group being connected downstream, the first shaft is connected on the output side to the main gear mechanism, and the fifth shaft of the gear mechanism shifting group is connected to the gear mechanism output shaft. It is possible that the gear mechanism output shaft and the fifth shaft are configured in one part or in multiple parts.

In the case of the proposed bottom bracket gear mechanism, a multi-step main gear mechanism of any desired planetary configuration with at least one further planetary gear set and at least two further shifting elements is usable. The main gear mechanism is preferably a four-gear gear mechanism, and accordingly has two further planetary gear sets, namely a third and fourth planetary gear set with four further shifting elements.

Within the context of a first embodiment of the main gear mechanism, it is provided that a second element of the fourth planetary gear set is connected to the gear mechanism input shaft or to the fifth shaft of the gear mechanism shifting group, a first element of the fourth planetary gear set is connected to a second element of the third planetary gear set, and a third element of the fourth planetary gear set is connected to the gear mechanism output shaft or to the first shaft of the gear mechanism shifting group. A first element of the third planetary gear set is fixable via a third shifting element which is a brake, and is connectable to the gear mechanism input shaft or to the fifth shaft of the gear mechanism shifting group via a seventh shifting element which is a clutch or freewheel. A third element of the third planetary gear set is fixable via a fourth shifting element which is a brake, and is connectable to the gear mechanism output shaft or to the first shaft of the gear mechanism shifting group via an eighth shifting element which is a clutch or freewheel.

Within the context of a second embodiment of the main gear mechanism, it is provided that a second element of the third planetary gear set is connected to the gear mechanism input shaft or to the fifth shaft of the gear mechanism shifting group, a first element of the third planetary gear set is connected to a second element of the fourth planetary gear set, and a third element of the third planetary gear set is connected to the gear mechanism output shaft or to the first shaft of the gear mechanism shifting group. A third element of the fourth planetary gear set is fixable via a fourth shifting element which is a brake, and is connectable to the gear mechanism input shaft or to the fifth shaft of the gear mechanism shifting group via an eighth shifting element which is a clutch or freewheel. A first element of the fourth planetary gear set is fixable via a third shifting element which is a brake, and is connectable to the gear mechanism output shaft or to the first shaft of the gear mechanism shifting group via a seventh shifting element which is a clutch or freewheel.

Within the context of a third embodiment of the main gear mechanism, it is provided that a second element of the third planetary gear set is connected to the gear mechanism input shaft or to the fifth shaft of the gear mechanism shifting group, a first element of the third planetary gear set is connected to a second element of the fourth planetary gear set, and a third element of the third planetary gear set is connected to the gear mechanism output shaft or to the first shaft of the gear mechanism shifting group. A third element of the fourth planetary gear set is fixable via a fourth shifting element which is a brake, and is connectable to the gear mechanism input shaft or to the fifth shaft of the gear mechanism shifting group via an eighth shifting element which is a clutch or freewheel. A first element of the fourth planetary gear set is fixable via a third shifting element which is a brake, and is connectable to the second element of the third planetary gear set and to the gear mechanism input shaft or to the fifth shaft of the gear mechanism shifting group via a seventh shifting element which is a clutch or freewheel.

One preferred embodiment of the invention provides that at least one of the provided planetary gear sets is a minus planetary gear set, which results in an arrangement which is particularly favorable in terms of installation space. It is also conceivable that one of the planetary gear sets is a plus planetary gear set.

A minus planetary gear set is preferably transferrable into a plus planetary gear set if the planetary gear carrier attachment and ring gear attachment on this gear set are swapped with one another, and the magnitude of the stationary gear ratio is increased by 1. On its planetary carrier, a minus planetary gear set has rotatably mounted planetary gears which mesh with the sun gear and the ring gear of this planetary gear set, with the result that, in the case of a fixed planetary gear carrier and a rotating sun gear, the ring gear rotates in an opposite direction to the sun gear rotational direction. On its planetary gear carrier, a plus planetary gear set has rotatably mounted inner and outer planetary gears which are in tooth engagement with one another, the sun gear of this planetary gear set meshing with the inner planetary gears, and the ring gear of this planetary gear set meshing with the outer planetary gears, with the result that, in the case of a fixed planetary gear carrier and a rotating sun gear, the ring gear rotates in a rotational direction which is identical to the sun gear rotational direction.

For a person skilled in the art, this means that, in the case of an individual gear set which is a minus planetary gear set, a first element or gear set element is a sun gear, a second element is a planetary gear carrier or spider, and a third element is a ring gear. Furthermore, this means that, in the case of an individual gear set which is a plus planetary gear set, the first element is a sun gear, the second element is a ring gear, and the third element is a planetary gear carrier or spider.

Furthermore, it is conceivable in the case of the proposed bottom bracket gear mechanism that multi-step planets are used both in the case of a minus planetary gear set and in the case of a plus planetary gear set. In the case of a minus multi-step planetary gear set, the assignment of the elements or the gear set elements is maintained as in the case of a conventional minus planetary gear set. In the case of a plus multi-step planetary gear set, it is provided that the first element is a first sun gear, the second element is a second sun gear and the third element is a planetary gear carrier, or that the first element is a first ring gear, the second element is a second ring gear, and the third element is a planetary gear carrier.

Within the context of the present invention, it is provided in the case of the proposed bottom bracket gear mechanism with the main gear mechanism and the gear mechanism shifting group that the first shifting element and/or the second shifting element and/or the third shifting element and/or the fourth shifting element is a positively locking brake, and/or that the fifth shifting element and/or sixth shifting element and/or seventh shifting element and/or eighth shifting element is a freewheel.

The shifting elements which are brakes are preferably positively locking shifting elements, for example inexpensive shifting claws or the like, for example with a toothed brake ring and a corresponding shifting pawl. Brakes as shifting elements have the advantage that they are readily reached from the outside for actuation. Since the provided freewheels are used as clutches, it is advantageous if the brakes are configured, for example, as brakes which act on one side, in order to prevent blocking of the gear mechanism in the case of a rotational directional reversal at the drive or at the output. Non-actively switchable or actuable freewheels are preferably used as freewheels. This has the advantage that no switching actuation is required in the case of the passive switching elements. The non-actuable freewheel transmits a torque when it locks in the locking direction state. In the opposite rotational direction, no torque is transmitted, since the freewheel does not lock in the overrunning drive state. It is conceivable, however, that actively switchable freewheels or else actively switchable freewheel brakes are also used.

In order to further optimize the actuation of the proposed bottom bracket gear mechanism, at least one torque sensor or the like is provided on the drive and/or on the output.

In order to electrically assist the drive in the case of the proposed bottom bracket gear mechanism, at least one electric machine or the like is connected or is connectable or is couplable fixedly or releasably to the drive or to the pedal crank shaft or gear mechanism input shaft and/or to the output or to the gear mechanism output shaft. The electric machine is preferably axially parallel to the pedal crank shaft or gear mechanism input shaft, while the planetary gear sets are coaxial with respect to the pedal crank shaft or gear mechanism input shaft.

A further aspect of the present invention includes a bicycle or pedelec with the above-described bottom bracket gear mechanism. This results in the advantages which have already been described and further advantages.

BRIEF DESCRIPTION OF THE DRAWINGS

In the following text, the present invention will be explained further on the basis of the drawings, in which.

DETAILED DESCRIPTION

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 1:
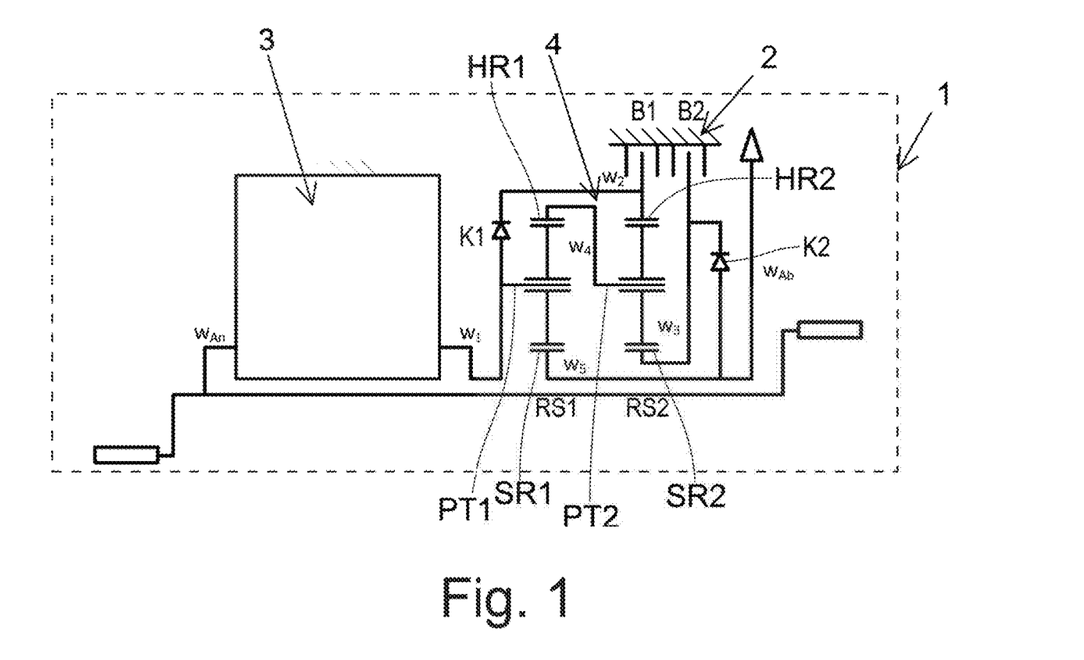
FIG. 1 shows a diagrammatic outline view of a first embodiment of a bottom bracket gear mechanism according to the invention on a bicycle or a pedelec with a gear mechanism shifting group which is connected downstream of a main gear mechanism.

FIGS. 1-17 show different design variants or embodiments, or shifting patterns of a bottom bracket gear mechanism according to the invention of planetary design, merely by way of example. FIG. 1 shows by way of example a bicycle or pedelec 1 (indicated merely diagrammatically) with the bottom bracket gear mechanism.

The bottom bracket gear mechanism is shown in a housing or bottom bracket housing 2 with a pedal crank shaft or pedal crank with pedals, the pedal crank shaft being connected to a gear mechanism input shaft WAn. Furthermore, the bottom bracket gear mechanism includes a gear mechanism output shaft WAb as an output with a chain sprocket or belt pulley (not shown further). Furthermore, a multi-step main gear mechanism 3 and a gear mechanism shifting group 4 are provided. The gear mechanism shifting group 4 has a first planetary gear set RS1 and a second planetary gear set RS2, and four shifting elements B1, B2, K1, K2. The main gear mechanism 3 and the gear mechanism shifting group 4 form two sub-gear mechanisms.

Independently of the respective design variants, it is provided in the case of the gear mechanism shifting group 4 that a second element of the first planetary gear set RS1 is connected to a first shaft W1, the first shaft W1 being connected to the gear mechanism input shaft WAn in the case of a gear mechanism shifting group 4 which is connected upstream, or being connected on the output side to the main gear mechanism 3 in the case of a gear mechanism shifting group 4 which is connected downstream. A third element of the first planetary gear set RS1 is connected via a fourth shaft W4 to a second element of the second planetary gear set RS2, and a first element of the first planetary gear set RS1 is connected to a fifth shaft W5, the fifth shaft W5 being connected to the gear mechanism output shaft WAb in the case of a downstream connected gear mechanism shifting group 4 or being connected on the input side to the main gear mechanism 3 in the case of an upstream connected gear mechanism shifting group 4. A first element of the second planetary gear set RS2 is fixable via a third shaft W3 and via a second shifting element B2 which is a brake. The third shaft W3 is connectable to the fifth shaft W5 via a sixth shifting element K2 which is a clutch or freewheel. A third element of the second planetary gear set RS2 is fixable via a second shaft W2 and via a first shifting element B1 which is a brake. The second shaft W2 is connectable to the first shaft W1 via a fifth shifting element K1 which is a clutch or freewheel.

Figure 2:
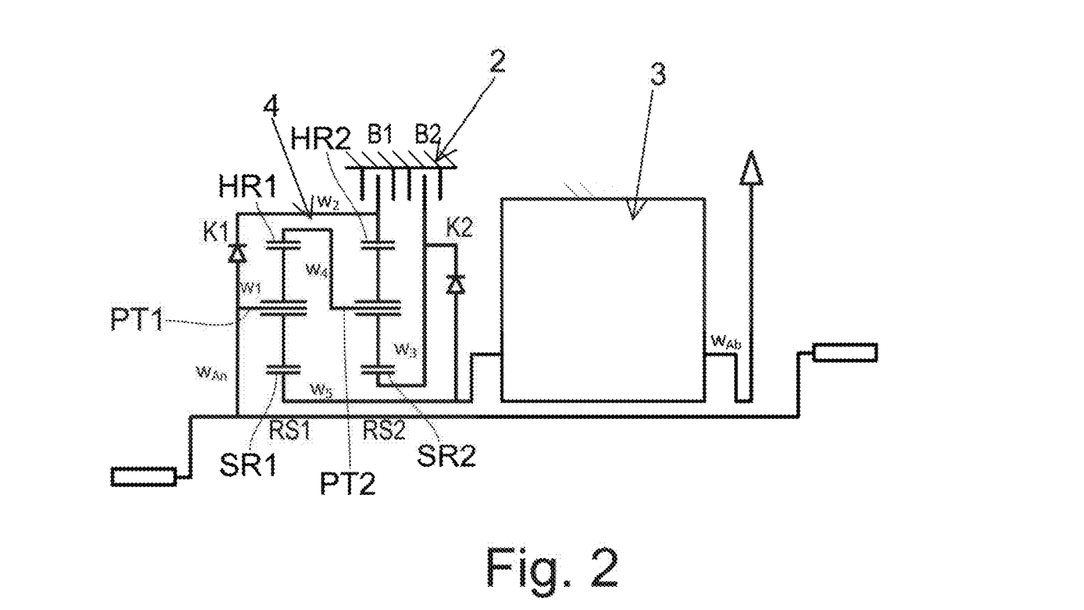
FIG. 2 shows a diagrammatic outline view of a second embodiment of the bottom bracket gear mechanism with the gear mechanism shifting group which is connected upstream of the main gear mechanism.

In FIGS. 1 and 2, each of the two provided planetary gear sets RS1, RS2 is a minus planetary gear set, which are favorable in terms of installation space. In each of the planetary gear sets RS1, RS2, a sun gear SR1, SR2 is the first element, a planetary gear carrier PT1, PT2 is the second element, and a ring gear HR1, HR2 is the third element FIG. 1 shows a first embodiment of the bottom bracket gear mechanism, in which the gear mechanism shifting group 4 is connected downstream of the multi-step main gear mechanism 3. In detail, it is provided in the case of the first embodiment according to FIG. 1 that the planetary gear carrier PT1 of the first planetary gear set RS1 is connected to the first shaft W1, that the first shaft W1 is connected on the output side to the main gear mechanism 3, that the ring gear HR1 of the first planetary gear set RS1 is connected via the fourth shaft W4 to the planetary gear carrier PT2 of the second planetary gear set RS2, that the sun gear SR1 of the first planetary gear set RS1 is connected to the fifth shaft W5, and that the fifth shaft W5 is connected to the gear mechanism output shaft WAb. The sun gear SR2 of the second planetary gear set RS2 is fixable on the housing 2 via the third shaft W3 and via the second shifting element B2 which is a brake. The third shaft W3 is connectable to the fifth shaft W5 via the sixth shifting element K2 which is a clutch or freewheel. The ring gear HR2 of the second planetary gear set RS2 is fixable on the housing 2 via the second shaft W2 and via the first shifting element B1 which is a brake. The second shaft W2 being connectable to the first shaft W1 via the fifth shifting element K1 which is a clutch or freewheel.

FIG. 2 shows a second embodiment of the bottom bracket gear mechanism, in which the gear mechanism shifting group 4 is connected upstream of the multi-step main gear mechanism 3. In detail, it is provided in the case of the second embodiment according to FIG. 2 that the planetary gear carrier PT1 of the first planetary gear set RS1 is connected via the first shaft W1 or directly to the gear mechanism input shaft WAn, that the ring gear HR1 of the first planetary gear set RS1 is connected via the fourth shaft W4 to the planetary gear carrier PT2 of the second planetary gear set RS2, that the sun gear SR1 of the first planetary gear set RS1 is connected to the fifth shaft W5, and that the fifth shaft W5 is connected on the input side to the main gear mechanism 3. The sun gear SR2 of the second planetary gear set RS2 is fixable on the housing 2 via the third shaft W3 and via the second shifting element B2 which is a brake. The third shaft W3 is connectable to the fifth shaft W5 via the sixth shifting element K2 which is a clutch or freewheel. The ring gear HR2 of the second planetary gear set RS2 is fixable on the housing 2 via the second shaft W2 and via the first shifting element B1 which is a brake. The second shaft W2 is connectable to the first shaft W1 or directly to the gear mechanism input shaft WAn via the fifth shifting element K1 which is a clutch or freewheel.

Figure 3:
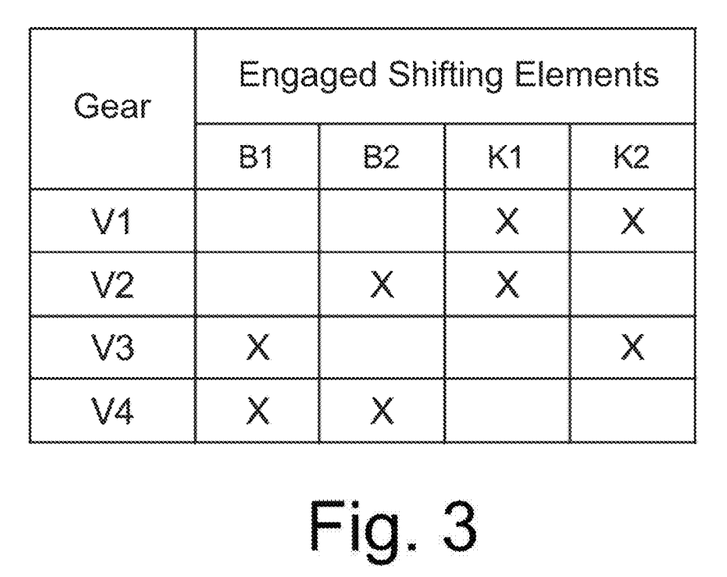
FIG. 3 shows a shifting pattern with four shiftable gears of the gear mechanism shifting group in the case of the bottom bracket gear mechanism.

FIG. 3 shows a shifting pattern for the gear mechanism shifting group 4 as a four-gear gear mechanism. The result of this is that four gears V1, V2, V3, V4 are realized by the gear mechanism shifting group. The shifting elements B1, B2, K1, K2 used for the respective gear V1, V2, V3, V4 are indicated in the shifting pattern. Here, an "X" at the freewheels K1, K2 as shifting elements in the shifting pattern means that the freewheels lock. This functions automatically without external actuation. Furthermore, an "X" at the brakes B1, B2 as shifting elements in the shifting pattern means that the brake B1, B2 is closed. This functions via a suitable actuator system.

In detail, the result from the shifting pattern according to FIG. 3 is that, in order to shift a first gear V1, the first shifting element B1 which is a brake and the second shifting element B2 which is a brake are open, and the fifth shifting element K1 which is a freewheel and the sixth shifting element K2 which is a freewheel are locking. In order to shift a second gear V2, the first shifting element B1 which is a brake is open, the second shifting element B2 which is a brake is closed, the fifth shifting element K1 which is a freewheel is locking, and the sixth shifting element K2 which is a freewheel is not locking. In order to shift a third gear V3, the first shifting element B1 which is a brake is closed the second shifting element B2 which is a brake is open, the fifth shifting element K1 which is a freewheel is not locking, and the sixth shifting element K2 which is a freewheel is locking. In order to shift a fourth gear V4, the first shifting element B1 which is a brake and the second shifting element B2 which is a brake are closed, and the fifth shifting element K1 which is a freewheel and the sixth shifting element K2 which is a freewheel are not locking.

Figure 4:
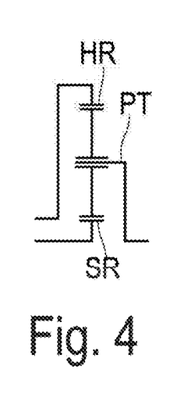
FIG. 4 shows a diagrammatic outline view of a planetary gear set as a minus planetary gear set.

FIG. 4 shows by way of example a minus planetary gear set, in which the first element is a sun gear 1-SR, the second element is a planetary gear carrier 2-PT, and the third element is a ring gear 3-HR.

Figure 5:
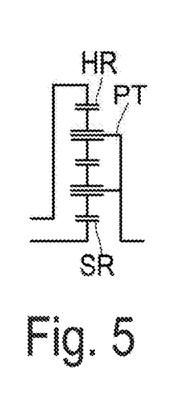
FIG. 5 shows a diagrammatic outline view of a planetary gear set as a plus planetary gear set.

FIG. 5 shows by way of example a plus planetary gear set, in which the first element is a sun gear 1-SR, the second element is a ring gear 2-HR, and the third element is a planetary gear carrier 3-PT.

Figure 6:
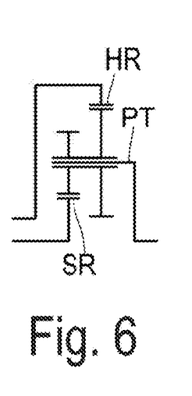
FIG. 6 shows a diagrammatic outline view of a planetary gear set as a minus multi-step planetary gear set.

FIG. 6 shows by way of example a minus multi-step planetary gear set, in which the first element is a sun gear 1-SR, the second element is a planetary gear carrier 2-PT, and the third element is a ring gear 3-HR.

Figure 7:
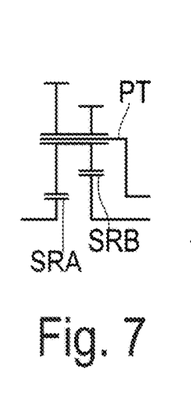
FIG. 7 shows a diagrammatic outline view of a planetary gear set as a plus multi-step planetary gear set with two sun gears.

FIG. 7 shows by way of example a plus multi-step planetary gear set, in which the first element is a first sun gear 1-SRA, the second element is a second sun gear 2-SRB, and the third element is a planetary gear carrier 3-PT.

Figure 8:
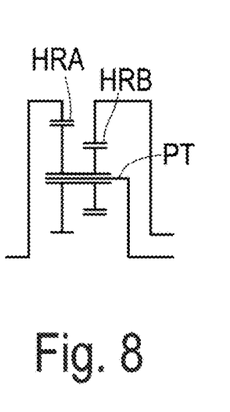
FIG. 8 shows a diagrammatic outline view of a planetary gear set as a plus multi-step planetary gear set with two ring gears.

FIG. 8 shows by way of example a further embodiment of a plus multi-step planetary gear set, in which the first element is a first ring gear 1-HRA, the second element is a second ring gear 2-HRB, and the third element is a planetary gear carrier 3-PT.

The possible embodiments which are shown in FIGS. 4 to 8 on the basis of a planetary gear set is transferrable to the specific planetary gear sets RS1, RS2, RS3, RS4 of the bottom bracket gear mechanism according to the invention.

FIGS. 9-12 show by way of example three different embodiments of the main gear mechanism 3, as a four-gear gear mechanism which is connected upstream of the gear mechanism shifting group 4. It is readily possible, however, that the main gear mechanism 3 is connected downstream of the gear mechanism shifting group 4. The main gear mechanism 3 preferably includes a third planetary gear set RS3 and a fourth planetary gear set RS4, and four shifting elements B3, B4, K3, K4.

Figure 9:
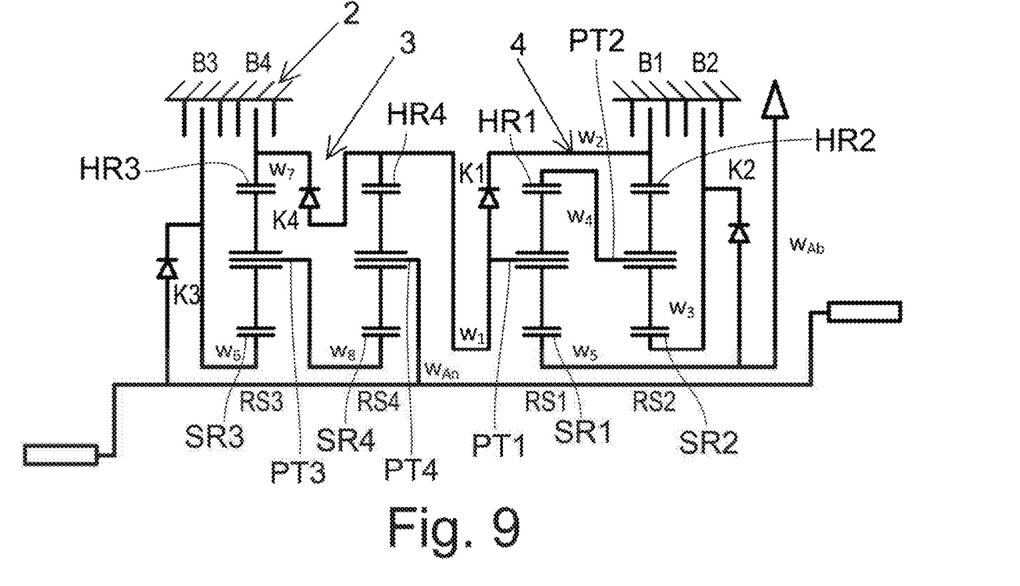
FIG. 9 shows a diagrammatic outline view of the bottom bracket gear mechanism with a first embodiment of the main gear mechanism, as four-gear gear mechanism, which is connected upstream of the gear mechanism shifting group.
Figure 10:
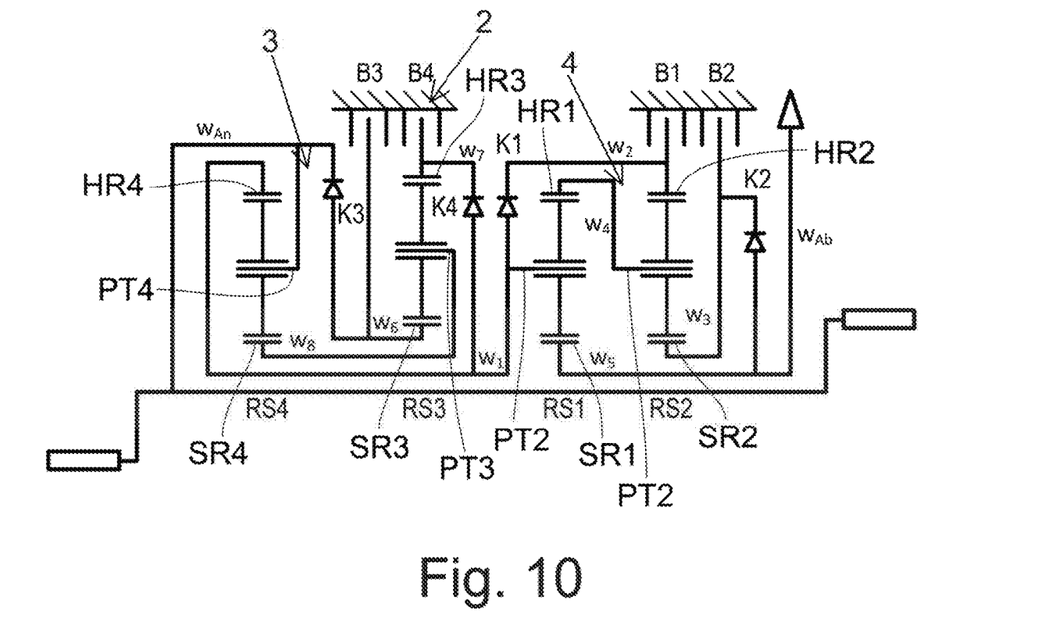
FIG. 10 shows a diagrammatic outline view of the bottom bracket gear mechanism with planetary gear sets which are swapped in an axial sequence in the case of the first embodiment of the main gear mechanism, as four-gear gear mechanism, which is connected upstream of the gear mechanism shifting group.

The two illustrations of a first embodiment according to FIG. 9 and according to FIG. 10 differ merely in that the axial sequence of the third planetary gear set RS3 and the fourth planetary gear set RS4 are swapped.

In the case of the first, second and third embodiment of the main gear mechanism 3 according to FIGS. 9 to 12, the provided planetary gear sets RS1, RS2, RS3, RS4 of the main gear mechanism 3 and the gear mechanism shifting group 4 in the case of the proposed bottom bracket gear mechanism are each minus planetary gear sets, which are favorable in terms of installation space. It is provided here that in each of the planetary gear sets RS1, RS2, RS3, RS4, a sun gear SR1, SR2, SR3, SR4 is provided as first element, a planetary gear carrier PT1, PT2, PT3, PT4 is provided as second element, and a ring gear HR1, HR2, HR3, HR4 is provided as third element.

In the case of the first embodiment of the main gear mechanism according to FIGS. 9 and 10, it is provided in detail that a planetary gear carrier PT4 of the fourth planetary gear set RS4 is connected to the gear mechanism input shaft WAn, that a sun gear SR4 of the fourth planetary gear set RS4 is connected via an eighth shaft W8 to a planetary gear carrier PT3 of the third planetary gear set RS3, and that a ring gear HR4 of the fourth planetary gear set RS4 is connected to the first shaft W1 of the gear mechanism shifting group 4. A sun gear SR3 of the third planetary gear set RS3 is fixable on the housing 2 via a sixth shaft W6 and via a third shifting element B3 which is a brake, and is connectable via a seventh shifting element K3 which is a clutch or freewheel to the gear mechanism input shaft WAn. A ring gear HR3 of the third planetary gear set RS3 is fixable on the housing 2 via a seventh shaft W7 and via a fourth shifting element B4 which is a brake, and is connectable via an eighth shifting element K4 which is a clutch or freewheel to the first shaft W1 of the gear mechanism shifting group 4. The attachments of the first and second planetary gear sets RS1, RS2 of the gear mechanism shifting group 4 have already been described.

Figure 11:
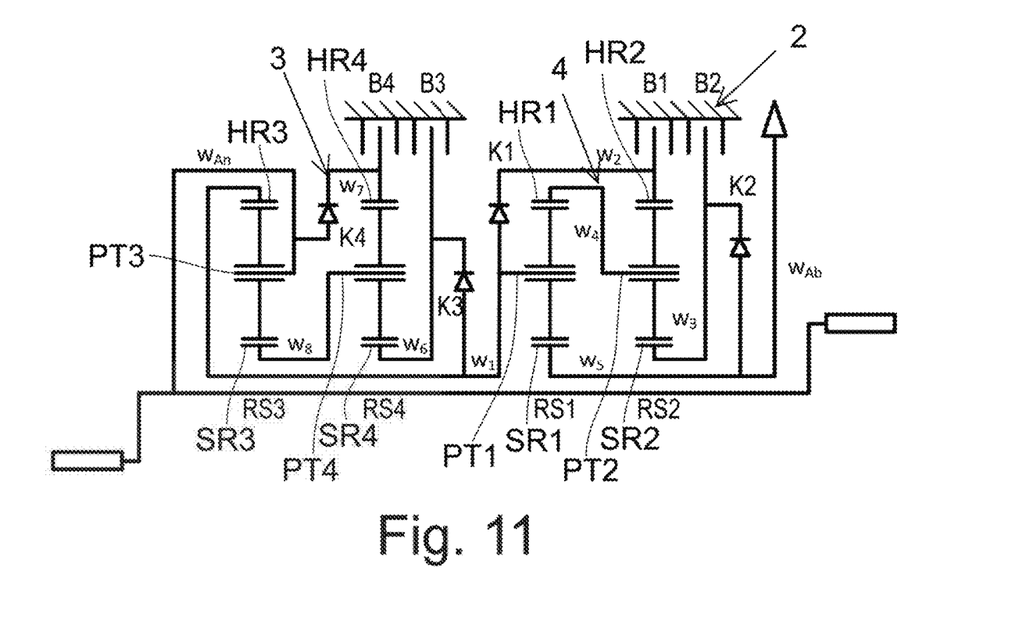
FIG. 11 shows a diagrammatic outline view of the bottom bracket gear mechanism with a second embodiment of the main gear mechanism, as four-gear gear mechanism, which is connected upstream of the gear mechanism shifting group.

In the case of the second embodiment of the main gear mechanism 3 according to FIG. 11, it is provided in detail that a planetary gear carrier PT3 of the third planetary gear set RS3 is connected to the gear mechanism input shaft WAn, that a sun gear SR3 of the third planetary gear set RS3 is connected via an eighth shaft W8 to a planetary gear carrier PT4 of the fourth planetary gear set RS4, and that a ring gear HR3 of the third planetary gear set RS3 is connected to the first shaft W1 of the gear mechanism shifting group 4. A ring gear HR4 of the fourth planetary gear set RS4 is fixable on the housing 2 via a seventh shaft W7 and via a fourth shifting element B4 which is a brake, and is connectable via an eighth shifting element K4 which is a clutch or freewheel to the gear mechanism input shaft WAn. A sun gear SR4 of the fourth planetary gear set RS4 is fixable on the housing 2 via a sixth shaft W6 and via a third shifting element B3 which is a brake, and is connectable via a seventh shifting element K3 which is a clutch or freewheel to the first shaft W1 of the gear mechanism shifting group 4. The attachments of the first and second planetary gear sets RS1, RS2 of the gear mechanism shifting group 4 have already been described.

Figure 12:
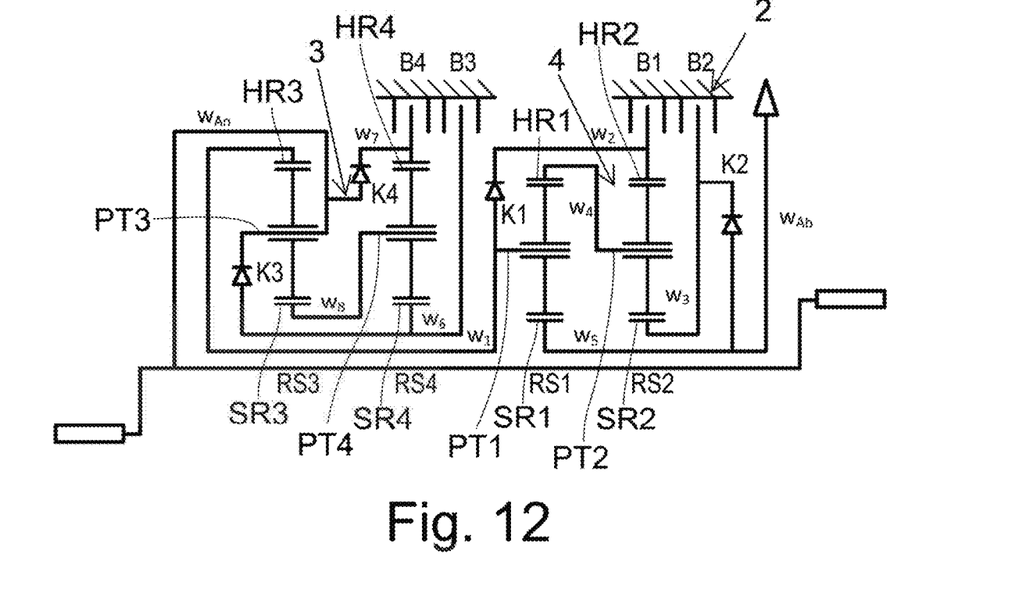
FIG. 12 shows a diagrammatic outline view of the bottom bracket gear mechanism with a third embodiment of the main gear mechanism, as four-gear gear mechanism, which is connected upstream of the gear mechanism shifting group.

In the case of the third embodiment of the main gear mechanism 3 according to FIG. 12, it is provided in detail that a planetary gear carrier PT3 of the third planetary gear set RS3 is connected to the gear mechanism input shaft WAn, that a sun gear SR3 of the third planetary gear set RS3 is connected via an eighth shaft W8 to a planetary gear carrier PT4 of the fourth planetary gear set RS4, and that a ring gear HR3 of the third planetary gear set RS3 is connected to the first shaft W1 of the gear mechanism shifting group 4. A ring gear HR4 of the fourth planetary gear set RS4 is fixable on the housing 2 via a seventh shaft W7 and via a fourth shifting element B4 which is a brake, and is connectable to the gear mechanism input shaft WAn via an eighth shifting element K4 which is a clutch or freewheel. A sun gear SR4 of the fourth planetary gear set RS4 is fixable on the housing 2 via a sixth shaft W6 and via a third shifting element B3 which is a brake, and is connectable via a seventh shifting element K3 which is a clutch or freewheel to the planetary gear carrier PT3 of the third planetary gear set RS3. The attachments of the first and second planetary gear sets RS1, RS2 of the gear mechanism shifting group 4 have already been described.

Figure 13:
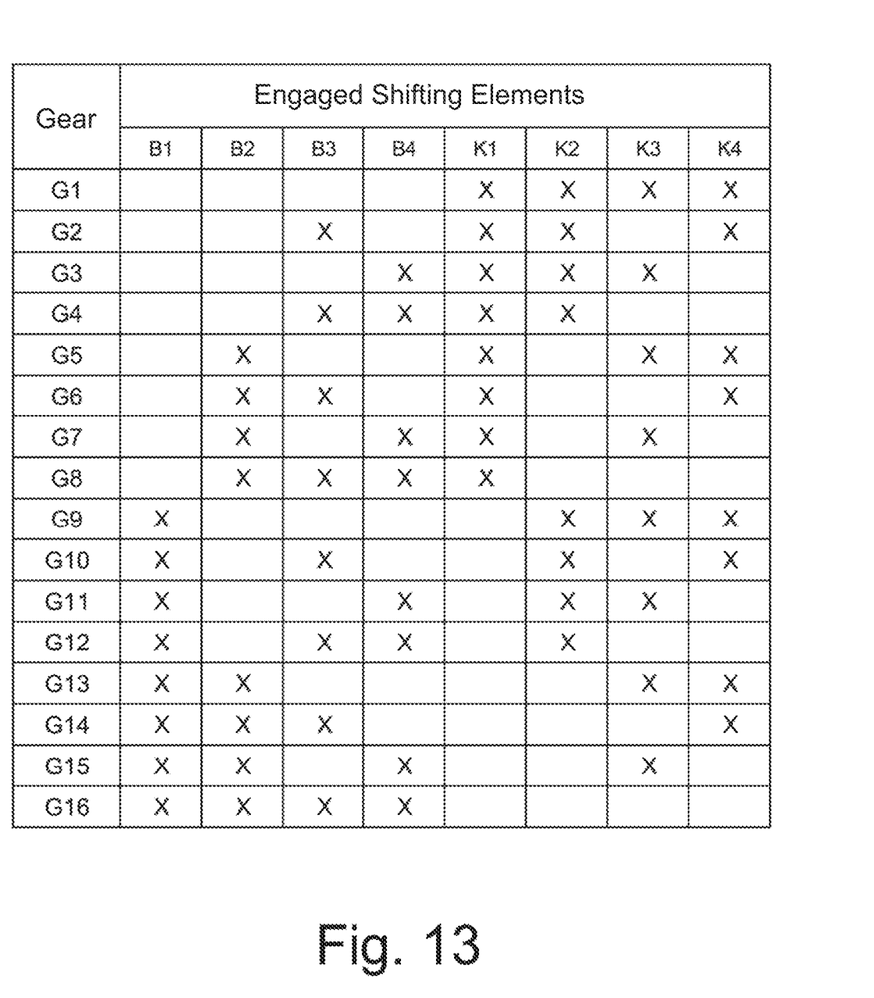
FIG. 13 shows a shifting pattern of the bottom bracket gear mechanism according to FIGS. 9-12.

FIG. 13 shows by way of example a shifting pattern for the embodiments of the bottom bracket gear mechanism according to the invention which are shown in FIGS. 9-12. The fact that the gear mechanism shifting group 4 has four gears and the main gear mechanism 4 has four gears results in a total of 4×4=16 shiftable gears G1-G16. The shifting elements B1, B2, B3, B4, K1, K2, K3, K4 used for the respective gear G1-G16 are specified in the shifting pattern. Here, an "X" in the case of the freewheel K1, K2, K3, K4 as shifting elements in the shifting pattern means that the freewheel locks. This functions automatically without external actuation. Furthermore, an "X" in the case of the brakes B1, B2, B3, B4 as shifting elements in the shifting pattern means that the brake B1, B2, B3, B4 is closed. This functions via a suitable actuator system.

In detail, the result from the shifting pattern according to FIG. 13 is that, in order to realize a first gear G1, the first shifting element B1 which is a brake, the second shifting element B2 which is a brake, the third shifting element B3 which is a brake, and the fourth shifting element B4 which is a brake are all open, and the fifth shifting element K1 which is a freewheel, the sixth shifting element K2 which is a freewheel, the seventh shifting element K3 which is a freewheel, and the eighth shifting element K4 which is a freewheel are all locking. In order to realize a second gear G2, the first shifting element B1 which is a brake, the second shifting element B2 which is a brake, and the fourth shifting element B4 which is a brake are open, the third shifting element B3 which is a brake is closed, the fifth shifting element K1 which is a freewheel, the sixth shifting element K2 which is a freewheel, and the eighth shifting element K4 which is a freewheel are locking, and the seventh shifting element K3 which is a freewheel is not locking. In order to realize a third gear G3, the first shifting element B1 which is a brake, the second shifting element B2 which is a brake, and the third shifting element B3 which is a brake are open, and the fourth shifting element B4 which is a brake is closed, the fifth shifting element K1 which is a freewheel, the sixth shifting element K2 which is a freewheel, and the seventh shifting element K3 which is a freewheel are locking, and the eighth shifting element K4 which is a freewheel is not locking. In order to realize a fourth gear G4, the first shifting element B1 which is a brake and the second shifting element B2 which is a brake are open, the third shifting element B3 which is a brake and the fourth shifting element B4 which is a brake are closed, the fifth shifting element K1 which is a freewheel and the sixth shifting element K2 which is a freewheel are locking, and the seventh shifting element K3 which is a freewheel and the eighth shifting element K4 which is a freewheel are not locking. In order to realize a fifth gear G5, the first shifting element B1 which is a brake, the third shifting element B3 which is a brake, and the fourth shifting element B4 which is a brake are open, the second shifting element B2 which is a brake is closed, the fifth shifting element K1 which is a freewheel, the seventh shifting element K3 which is a freewheel, and the eighth shifting element K4 which is a freewheel are locking, and the sixth shifting element K2 which is a freewheel is not locking. In order to realize a sixth gear G6, the first shifting element B1 which is a brake and the fourth shifting element B4 which is a brake are open, the second shifting element B2 which is a brake and the third shifting element B3 which is a brake are closed, the fifth shifting element K1 which is a freewheel and the eighth shifting element K4 which is freewheel are locking, and the sixth shifting element K2 which is a freewheel and the seventh shifting element K3 which is a freewheel are not locking. In order to realize a seventh gear G7, the first shifting element B1 which is a brake and the third shifting element B3 which is a brake are open, the second shifting element B2 which is a brake and the fourth shifting element B4 which is a brake are closed, the fifth shifting element K1 which is a freewheel and the seventh shifting element K3 which is a freewheel are locking, and the sixth shifting element K2 which is a freewheel and the eighth shifting element K4 which is a freewheel are not locking. In order to realize an eighth gear G8, the first shifting element B1 which is a brake is open, the second shifting element B2 which is a brake, the third shifting element B3 which is a brake, and the fourth shifting element B4 which is a brake are closed, the fifth shifting element K1 which is a freewheel is locking, and the sixth shifting element K2 which is a freewheel, the seventh shifting element K3 which is a freewheel, and the eighth shifting element K4 which is a freewheel are not locking. In order to realize a ninth gear G9, the first shifting element B1 which is a brake is closed, the second shifting element B2 which is a brake, the third shifting element B3 which is a brake, and the fourth shifting element B4 which is a brake are open, the fifth shifting element K1 which is a freewheel is not locking, and the sixth shifting element K2 which is a freewheel, the seventh shifting element K3 which is a freewheel, and the eighth shifting element K4 which is a freewheel are locking. In order to realize a tenth gear G10, the first shifting element B1 which is a brake and the third shifting element B3 which is a brake are closed, the second shifting element B2 which is a brake and the fourth shifting element B4 which is a brake are open, the fifth shifting element K1 which is a freewheel and the seventh shifting element K3 which is a freewheel are not locking, and the sixth shifting element K2 which is a freewheel and the eighth shifting element K4 which is a freewheel are locking. In order to realize an eleventh gear G11, the first shifting element B1 which is a brake and the fourth shifting element B4 which is a brake are closed, the second shifting element B2 which is a brake and the third shifting element B3 which is a brake are open, the fifth shifting element K1 which is a freewheel and the eighth shifting element K4 which is a freewheel are not locking, and the sixth shifting element K2 which is a freewheel and the seventh shifting element K3 which is a freewheel are locking. In order to realize a twelfth gear G12, the first shifting element B1 which is a brake, the third shifting element B3 which is a brake, and the fourth shifting element B4 which is a brake are closed, the second shifting element B2 which is a brake is open, the fifth shifting element K1 which is a freewheel, the seventh shifting element K3 which is a freewheel, and the eighth shifting element K4 which is a freewheel are not locking, and the sixth shifting element K2 which is a freewheel is locking. In order to realize a thirteenth gear G13, the first shifting element B1 which is a brake and the second shifting element B2 which is a brake are closed, the third shifting element B3 which is a brake and the fourth shifting element B4 which is a brake are open, the fifth shifting element K1 which is a freewheel and the sixth shifting element K2 which is a freewheel are not locking, and the seventh shifting element K3 which is a freewheel and the eighth shifting element K4 which is a freewheel are locking. In order to realize a fourteenth gear G14, the first shifting element B1 which is a brake, the second shifting element B2 which is a brake, and the third shifting element B3 which is a brake are closed, the fourth shifting element B4 which is a brake is open, the fifth shifting element K1 which is a freewheel, the sixth shifting element K2 which is a freewheel, and the seventh shifting element K3 which is a freewheel are not locking, and the eighth shifting element K4 which is a freewheel is locking. In order to realize a fifteenth gear G15, the first shifting element B1 which is a brake, the second shifting element B2 which is a brake, and the fourth shifting element B4 which is a brake are closed, the third shifting element B3 which is a brake is open, the fifth shifting element K1 which is a freewheel, the sixth shifting element K2 which is a freewheel, and the eighth shifting element K4 which is a freewheel are not locking, and the seventh shifting element K3 which is a freewheel is locking. In order to realize a sixteenth gear G16, the first shifting element B1 which is a brake, the second shifting element B2 which is a brake, the third shifting element B3 which is a brake, and the fourth shifting element B4 which is a brake are all closed, and the fifth shifting element K1 which is a freewheel, the sixth shifting element K2 which is a freewheel, the seventh shifting element K3 which is a freewheel, and the eighth shifting element K4 which is a freewheel are all not locking.

Figure 14:
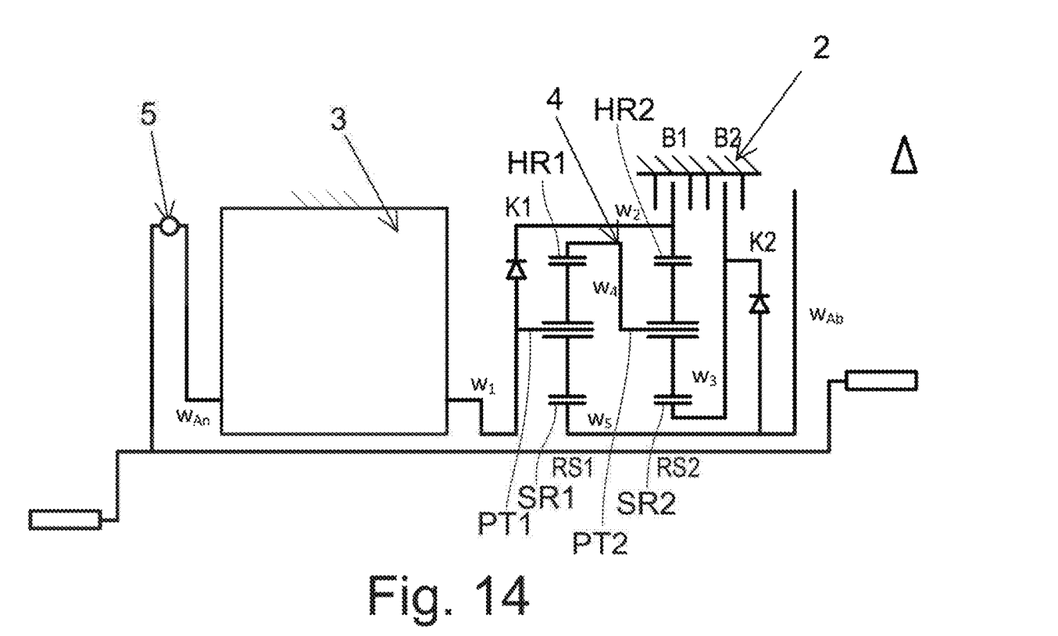
FIG. 14 shows a diagrammatic outline view of the bottom bracket gear mechanism according to FIG. 1 with a torque sensor (indicated by way of example) at the drive.

FIG. 14 shows one embodiment of the bottom bracket gear mechanism according to the invention on the basis of the first design variant, in the case of which a torque sensor 5 is connected or is connectable to the pedal crank shaft or to the gear mechanism input shaft WAn. For example, a disk-shaped torque sensor 5 is on the gear mechanism input. The torque sensor 5 is also configurable in a different way, however.

Figure 15:
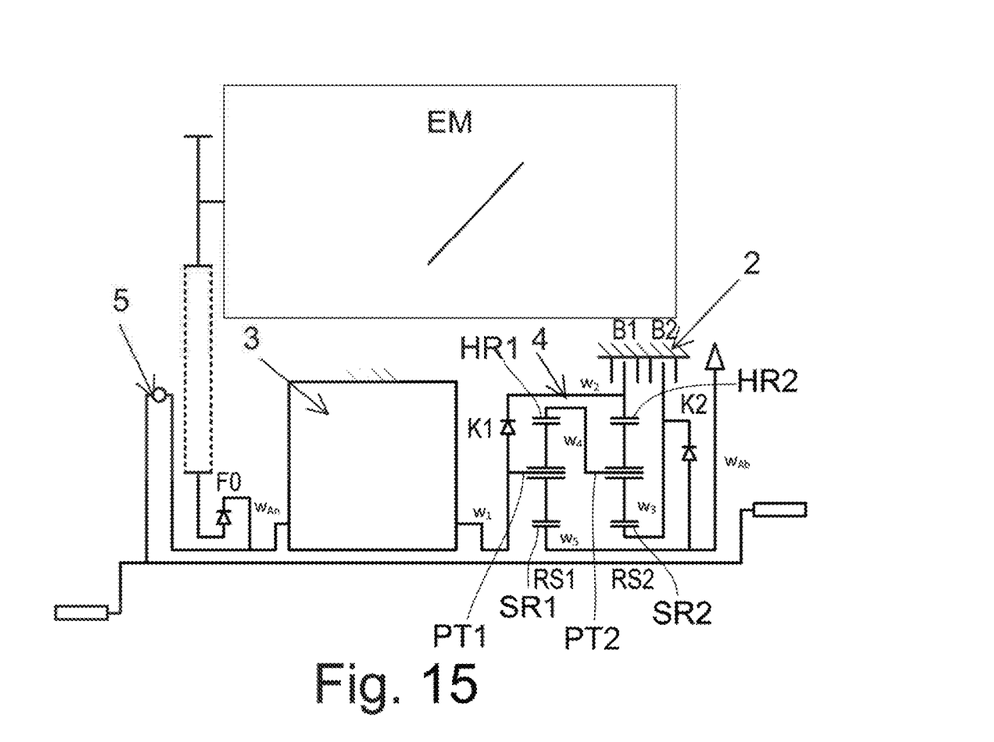
FIG. 15 shows a diagrammatic outline view of the bottom bracket gear mechanism according to FIG. 14 with an electric machine which is arranged by way of example at the drive.
Figure 16:
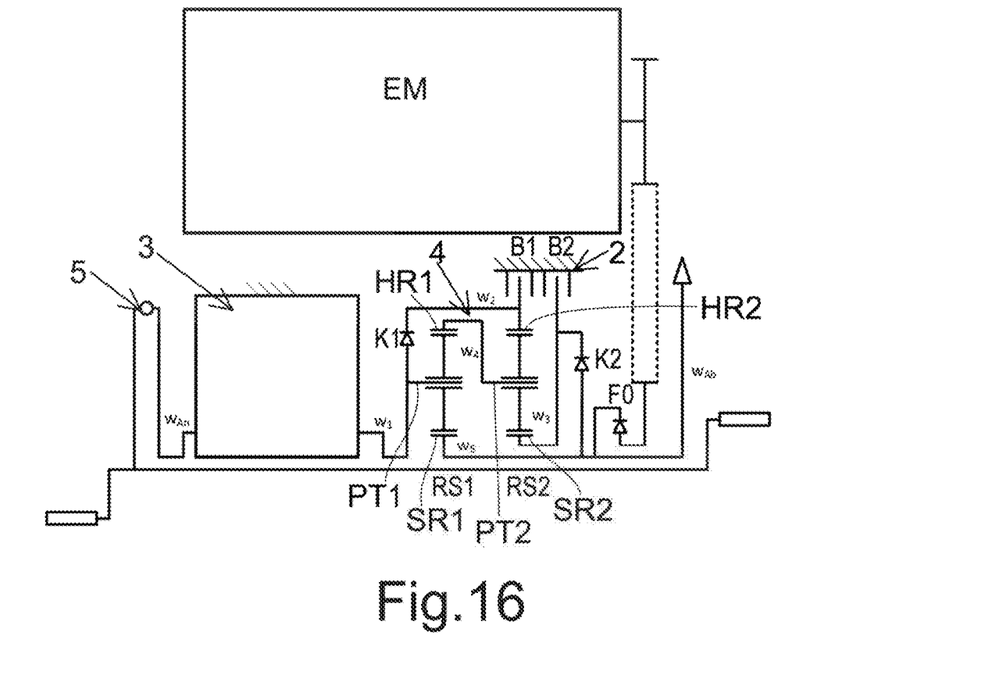
FIG. 16 shows a diagrammatic outline view of the bottom bracket gear mechanism according to FIG. 14 with an electric machine which is arranged by way of example at the output.

FIGS. 15 and 16 each show one embodiment of the bottom bracket gear mechanism according to the invention on the basis of the first embodiment with an additional electric machine EM. The electric machine EM can be attached to the pedal crank shaft WAn, as is indicated in FIG. 15. It is also conceivable that the electric machine EM is attached to the gear mechanism output shaft WAb, as is shown in FIG. 16. The electric machine EM is preferably axially parallel to the pedal crank shaft or gear mechanism input shaft WAn. A coaxial arrangement of the electric machine EM with respect to the pedal crank shaft is also possible, however. Regardless of this, it is advantageous for the electric machine EM to be attached via a freewheel F0 or the like, in order that no losses are caused by the corotating electric machine EM in the case of operation without the electric machine EM.

Figure 17:
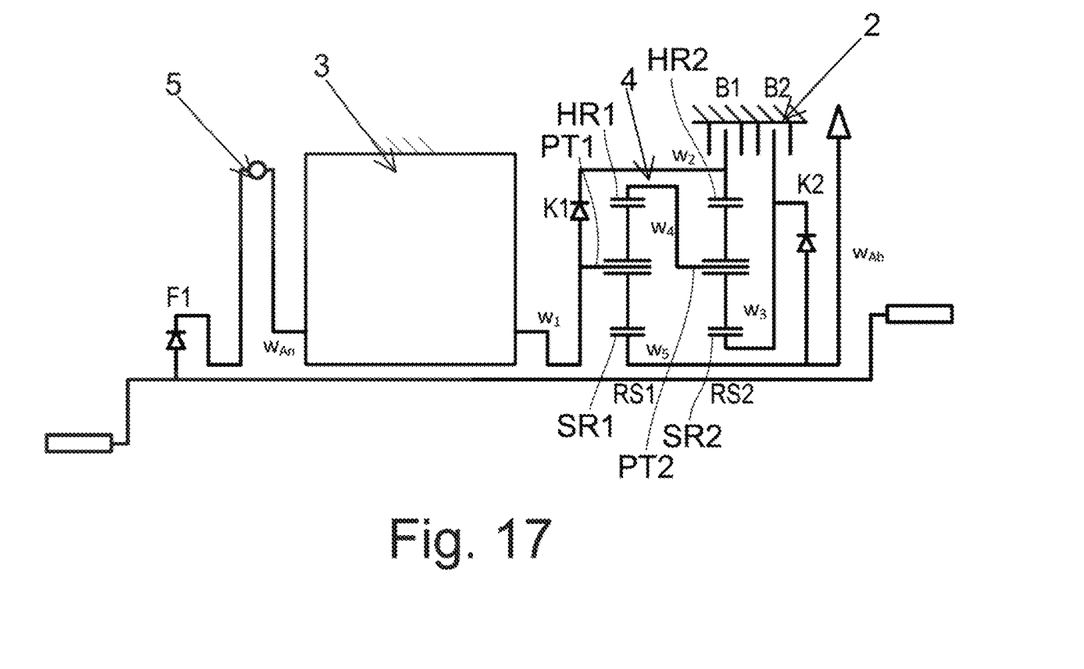
FIG. 17 shows a diagrammatic outline view of the bottom bracket gear mechanism according to FIG. 14 with a freewheel which is provided between the pedal crank shaft and the gear mechanism input shaft.

FIG. 17 shows one embodiment of the bottom bracket gear mechanism according to the invention on the basis of the first embodiment with an additional freewheel F1 between the pedal crank shaft and the gear mechanism input shaft WAn. In this way, in the case of pedaling interruption, the freewheel opens and decouples the pedal crank shaft from the inertial masses of the gear mechanism gear set and, in particular, the electric machine EM, with the result that no mass forces are perceptible at the pedal.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

LIST OF DESIGNATIONS

1 Bicycle or pedelec
2 Housing or bottom bracket housing
3 Multi-step main gear mechanism
4 Gear mechanism shifting group
5 Torque sensor
EM Electric machine
F0 Freewheel for electric machine
F1 Additional freewheel
SR1 Sun gear of the first planetary gear set
PT1 Planetary gear carrier of the first planetary gear set
HR1 Ring gear of the first planetary gear set
SR2 Sun gear of the second planetary gear set
PT2 Planetary gear carrier of the second planetary gear set
HR2 Ring gear of the second planetary gear set SR3 Sun gear of the third planetary gear set
PT3 Planetary gear carrier of the third planetary gear set
HR3 Ring gear of the third planetary gear set
SR4 Sun gear of the fourth planetary gear set
PT4 Planetary gear carrier of the fourth planetary gear set
HR4 Ring gear of the fourth planetary gear set
SRA First sun gear in the case of a plus multi-step gear set
SRB Second sun gear in the case of a plus multi-step gear set
HRA First ring gear in the case of a plus multi-step gear set
HRB Second ring gear in the case of a plus multi-step gear set
RS1 First planetary gear set
RS2 Second planetary gear set
RS3 Third planetary gear set
RS4 Fourth planetary gear set
WAn Pedal crank shaft
WAb Gear mechanism output shaft
W1 First shaft
W2 Second shaft
W3 Third shaft
W4 Fourth shaft
W5 Fifth shaft
W6 Sixth shaft
W7 Seventh shaft
W8 Eighth shaft
V1 First gear in the gear mechanism shifting group
V2 Second gear in the gear mechanism shifting group
V3 Third gear in the gear mechanism shifting group
V4 Fourth gear in the gear mechanism shifting group
G1 First gear of the bottom bracket gear mechanism
G2 Second gear of the bottom bracket gear mechanism
G3 Third gear of the bottom bracket gear mechanism
G4 Fourth gear of the bottom bracket gear mechanism
G5 Fifth gear of the bottom bracket gear mechanism
G6 Sixth gear of the bottom bracket gear mechanism
G7 Seventh gear of the bottom bracket gear mechanism
G8 Eighth gear of the bottom bracket gear mechanism
G9 Ninth gear of the bottom bracket gear mechanism
G10 Tenth gear of the bottom bracket gear mechanism
G11 Eleventh gear of the bottom bracket gear mechanism
G12 Twelfth gear of the bottom bracket gear mechanism
G13 Thirteenth gear of the bottom bracket gear mechanism
G14 Fourteenth gear of the bottom bracket gear mechanism
G15 Fifteenth gear of the bottom bracket gear mechanism
G16 Sixteenth gear of the bottom bracket gear mechanism
B1 First shifting element which is a brake
B2 Second shifting element which is a brake
B3 Third shifting element which is a brake
B4 Fourth shifting element which is a brake
K1 Fifth shifting element which is a clutch or freewheel
K2 Sixth shifting element which is a clutch or freewheel
K3 Seventh shifting element which is a clutch or freewheel
K4 Eighth shifting element which is a clutch or freewheel
1-SR First element as sun gear
2-PT Second element as planetary gear carrier
2-HR Second element as ring gear
3-HR Third element as ring gear
3-PT Third element as planetary gear carrier
1-SRA First element as first sun gear
2-SRB Second element as second sun gear
1-HRA First element as first ring gear
2-HRB First element as second ring gear

The invention claimed is:
1. A bottom bracket gear mechanism for a bicycle or a pedelec (1), the bottom bracket gear mechanism comprising:
a gear mechanism input shaft (WAn) as a drive;
a gear mechanism output shaft (WAb) as an output;
a gear mechanism shifting group (4), the gear mechanism shifting group (4) comprising:
a first planetary gear set (RS1), a second element of the first planetary gear set (RS1) being connected to a first shaft (W1), a first element of the first planetary gear set (RS1) being connected to a fifth shaft (W5);
a second planetary gear set (RS2), a third element of the first planetary gear set (RS1) being connected via a fourth shaft (W4) to a second element of the second planetary gear set (RS2);
a first shifting element (B1), the first shifting element (B1) being a brake, a third element of the second planetary gear set (RS2) being fixable via a second shaft (W2) and the first shifting element (B1);
a second shifting element (B2), the second shifting element (B2) being a brake, a first element of the second planetary gear set (RS2) being fixable via a third shaft (W3) and the second shifting element (B2);
a fifth shifting element (K1), the fifth shifting element (K1) being a clutch or a freewheel, the second shaft (W2) being connected to the first shaft (W1) via the fifth shifting element (K1); and
a sixth shifting element (K2), the sixth shifting element (K2) being a clutch or a freewheel, the third shaft (W3) being connectable to the fifth shaft (W5) via the sixth shifting element (K2); and
a multi-step main gear mechanism (3), the multi-step main gear mechanism (3) comprising:
at least one additional planetary gear set (RS3, RS4), the at least one additional planetary gear set (RS3, RS4) comprising:
a third planetary gear set (RS3); and
a fourth planetary gear set (RS4), a second element of the fourth planetary gear set (RS4) being connected to the gear mechanism input shaft (WAn) or to the fifth shaft (W5) of the gear mechanism shifting group (4), a first element of the fourth planetary gear set (RS4) being connected to a second element of the third planetary gear set (RS3), a third element of the fourth planetary gear set (RS4) being connected to the gear mechanism output shaft (WAb) or to the first shaft (W1) of the gear mechanism shifting group (4); and
at least two shifting elements (B3, B4, K3, K4), the at least two shifting elements (B3, B4, K3, K4) comprising:
a third shifting element (B3), the third shifting element (B3) being a brake, a first element of the third planetary gear set (RS3) being fixable via the third shifting element (B3);
a fourth shifting element (B4), the fourth shifting element (B4) being a brake, a third element of the third planetary gear set (RS3) being fixable via the fourth shifting element (B4);
a seventh shifting element (K3), the seventh shifting element (K3) being a clutch or a freewheel, the first element of the third planetary gear set (RS3) being connectable to the gear mechanism input shaft (WAn) or to the fifth shaft (W5) of the gear mechanism shifting group (4) via the seventh shifting element (K3); and an eighth shifting element (K4), the eighth shifting element (K4) being a clutch or a freewheel, the third element of the third planetary gear set (RS3) being connectable to the gear mechanism output shaft (WAb) or to the first shaft (W1) of the gear mechanism shifting group (4) via the eighth shifting element (K4).

2. The bottom bracket gear mechanism of claim 1, wherein the gear mechanism shifting group (4) is connected upstream or downstream of the multi-step main gear mechanism (3).

3. The bottom bracket gear mechanism of claim 1, wherein at least one planetary gear set of the first planetary gear set (RS1), the second planetary gear set (RS2), or the at least one additional planetary gear set (RS3, RS4) is a minus planetary gear set or a minus multi-step planetary gear set, the first element of the at least one planetary gear set being a sun gear (SR1, SR2, SR3, SR4), the second element of the at least one planetary gear set being a planetary gear carrier (PT1, PT2, PT3, PT4), and the third element of the at least one planetary gear set being a ring gear (HR1, HR2, HR3, HR4).

4. The bottom bracket gear mechanism of claim 1, wherein at least one planetary gear set of the first planetary gear set (RS1), the second planetary gear set (RS2), or the at least one additional planetary gear set (RS3, RS4) is a plus planetary gear set, the first element of the at least one planetary gear set being a sun gear (SR1, SR2, SR3, SR4), the second element of the at least one planetary gear set being a ring gear (HR1, HR2, HR3, HR4), and the third element of the at least one planetary gear set being a planetary gear carrier (PT1, PT2, PT3, PT4).

5. The bottom bracket gear mechanism of claim 1, wherein at least one planetary gear set of the first planetary gear set (RS1), the second planetary gear set (RS2), or the at least one additional planetary gear set (RS3, RS4) is a plus multi-step planetary gear set, and either:
the first element of the at least one planetary gear set being a first sun gear (SRA), the second element of the at least one planetary gear set being a second sun gear (SRB), and the third element of the at least one planetary gear set being a planetary gear carrier (PT1, PT2, PT3, PT4), or
the first element of the at least one planetary gear set being a first ring gear (HRA), the second element of the at least one planetary gear set being a second ring gear (HRB), and the third element of the at least one planetary gear set being the planetary gear carrier (PT1, PT2, PT3, PT4).

6. The bottom bracket gear mechanism of claim 1, wherein at least one of the first shifting element (B1), the second shifting element (B2), the third shifting element (B3), or the fourth shifting element (B4) is a positively locking brake, and
wherein at least one of the fifth shifting element (K1), the sixth shifting element (K2), seventh shifting element (K3), or the eighth shifting element (K4) is a non-actively actuable freewheel.

7. The bottom bracket gear mechanism of claim 1, further comprising a torque sensor (5) connected to the gear mechanism input shaft (Wan).

8. The bottom bracket gear mechanism of claim 1, further comprising at least one electric machine (EM) connected or connectable to the gear mechanism input shaft (WAn) or the gear mechanism output shaft (WAb).

9. The bottom bracket gear mechanism of claim 8, wherein the at least one electric machine (EM) is axially parallel to a pedal crank shaft, the gear mechanism input shaft (WAn), or both the pedal crank shaft and the gear mechanism input shaft (WAn).

10. The bottom bracket gear mechanism of claim 9, wherein each of a plurality of planetary gear sets (RS1, RS2, RS3, RS4) is coaxial with respect to the pedal crank shaft, the gear mechanism input shaft (WAn), or both the pedal crank shaft and the gear mechanism input shaft (WAn), the plurality of planetary gear sets including the first planetary gear set (RS1) and the second planetary gear set (RS2).

11. A bicycle or a pedelec (1), comprising the bottom bracket gear mechanism of claim 1.

12. A bottom bracket gear mechanism for a bicycle or a pedelec (1), the bottom bracket gear mechanism comprising:
a gear mechanism input shaft (WAn) as a drive:
a gear mechanism output shaft (WAb) as an output:
a gear mechanism shifting group (4), the gear mechanism shifting group (4) comprising:
a first planetary gear set (RS1), a second element of the first planetary gear set (RS1) being connected to a first shaft (W1), a first element of the first planetary gear set (RS1) being connected to a fifth shaft (W5);
a second planetary gear set (RS2), a third element of the first planetary gear set (RS1) being connected via a fourth shaft (W4) to a second element of the second planetary gear set (RS2);
a first shifting element (B1), the first shifting element (B1) being a brake, a third element of the second planetary gear set (RS2) being fixable via a second shaft (W2) and the first shifting element (B1);
a second shifting element (B2), the second shifting element (B2) being a brake, a first element of the second planetary gear set (RS2) being fixable via a third shaft (W3) and the second shifting element (B2);
a fifth shifting element (K1), the fifth shifting element (K1) being a clutch or a freewheel, the second shaft (W2) being connected to the first shaft (W1) via the fifth shifting element (K1); and
a sixth shifting element (K2), the sixth shifting element (K2) being a clutch or a freewheel, the third shaft (W3) being connectable to the fifth shaft (W5) via the sixth shifting element (K2); and
a multi-step main gear mechanism (3), the multi-step main gear mechanism (3) comprising:
at least one additional planetary gear set (RS3, RS4), the at least one additional planetary gear set (RS3, RS4) comprising:
a third planetary gear set (RS3), a second element of the third planetary gear set (RS3) being connected to the gear mechanism input shaft (WAn) or to the fifth shaft (W5) of the gear mechanism shifting group (4), a third element of the third planetary gear set (RS3) being connected to the gear mechanism output shaft (WAb) or to the first shaft (W1) of the gear mechanism shifting group (4); and
a fourth planetary gear set (RS4), a first element of the third planetary gear set (RS3) being connected to a second element of the fourth planetary gear set (RS4); and
at least two shifting elements (B3, B4, K3, K4), the at least two shifting elements (B3, B4, K3, K4) comprising:
a third shifting element (B3), the third shifting element (B3) being a brake, a first element of the fourth planetary gear set (RS4) being fixable via the third shifting element (B3), a fourth shifting element (B4), the fourth shifting element (B4) being a brake, a third element of the fourth planetary gear set (RS4) being fixable via the fourth shifting element (B4), a seventh shifting element (K3), the seventh shifting element (K3) being a clutch or a freewheel, the first element of the fourth planetary gear set (RS4) being connectable to the gear mechanism output shaft (WAb) or to the first shaft (W1) of the gear mechanism shifting group (4) via the seventh shifting element (K3), and an eighth shifting element (K4), the eighth shifting element (K4) being a clutch or a freewheel, a third element of the fourth planetary gear set (RS4) being connectable to the gear mechanism input shaft (WAn) or to the fifth shaft (W5) of the gear mechanism shifting group (4) via the eighth shifting element (K4).

13. The bottom bracket gear mechanism of claim 12, further comprising at least one electric machine (EM) connected or connectable to the gear mechanism input shaft (WAn) or the gear mechanism output shaft (WAb).

14. A bicycle or a pedelec (1), comprising the bottom bracket gear mechanism of claim 12.

15. A bottom bracket gear mechanism for a bicycle or a pedelec (1), the bottom bracket gear mechanism comprising:
  a gear mechanism input shaft (WAn) as a drive;
  a gear mechanism output shaft (WAb) as an output;
  a gear mechanism shifting group (4), the gear mechanism shifting group (4) comprising:
    a first planetary gear set (RS1), a second element of the first planetary gear set (RS1) being connected to a first shaft (W1), a first element of the first planetary gear set (RS1) being connected to a fifth shaft (W5);
    a second planetary gear set (RS2), a third element of the first planetary gear set (RS1) being connected via a fourth shaft (W4) to a second element of the second planetary gear set (RS2);
    a first shifting element (B1), the first shifting element (B1) being a brake, a third element of the second planetary gear set (RS2) being fixable via a second shaft (W2) and the first shifting element (B1);
    a second shifting element (B2), the second shifting element (B2) being a brake, a first element of the second planetary gear set (RS2) being fixable via a third shaft (W3) and the second shifting element (B2);
    a fifth shifting element (K1), the fifth shifting element (K1) being a clutch or a freewheel, the second shaft (W2) being connected to the first shaft (W1) via the fifth shifting element (K1); and
    a sixth shifting element (K2), the sixth shifting element (K2) being a clutch or a freewheel, the third shaft (W3) being connectable to the fifth shaft (W5) via the sixth shifting element (K2); and
  a multi-step main gear mechanism (3), the multi-step main gear mechanism (3) comprising:
    at least one additional planetary gear set (RS3, RS4), the at least one additional planetary gear set (RS3, RS4) comprising:
      a third planetary gear set (RS3), a second element of the third planetary gear set (RS3) being connected to the gear mechanism input shaft (WAn) or to the fifth shaft (W5) of the gear mechanism shifting group (4), a third element of the third planetary gear set (RS3) being connected to the gear mechanism output shaft (WAb) or to the first shaft (W1) of the gear mechanism shifting group (4); and
      a fourth planetary gear set (RS4), a first element of the third planetary gear set (RS3) being connected to a second element of the fourth planetary gear set (RS4); and
    at least two shifting elements (B3, B4, K3, K4), the at least two shifting elements (B3, B4, K3, K4) comprising:
      a third shifting element (B3), the third shifting element (B3) being a brake, a first element of the fourth planetary gear set (RS4) being fixable via the third shifting element (B3);
      a fourth shifting element (B4), the fourth shifting element (B4) being a brake, a third element of the fourth planetary gear set (RS4) being fixable via the fourth shifting element (B4);
      a seventh shifting element (K3), the seventh shifting element (K3) being a clutch or a freewheel, the first element of the fourth planetary gear set (RS4) being connectable to the second element of the third planetary gear set (RS3) and to the gear mechanism input shaft (WAn) or to the fifth shaft (W5) of the gear mechanism shifting group (4) via the seventh shifting element (K3); and
      an eighth shifting element (K4), the eighth shifting element (K4) being a clutch or a freewheel, the third element of the fourth planetary gear set (RS4) being connectable to the gear mechanism input shaft (WAn) or to the fifth shaft (W5) of the gear mechanism shifting group (4) via the eighth shifting element (K4).

16. The bottom bracket gear mechanism of claim 15, further comprising at least one electric machine (EM) connected or connectable to the gear mechanism input shaft (WAn) or the gear mechanism output shaft (WAb).

17. A bicycle or a pedelec (1), comprising the bottom bracket gear mechanism of claim 15.

18. A bottom bracket gear mechanism for a bicycle or a pedelec (1), the bottom bracket gear mechanism comprising:
  a gear mechanism input shaft (WAn) as a drive;
  a torque sensor (5) connected to the gear mechanism input shaft (Wan);
  a gear mechanism output shaft (WAb) as an output;
  a multi-step main gear mechanism (3); and
  a gear mechanism shifting group (4), the gear mechanism shifting group (4) comprising:
    a first planetary gear set (RS1), a second element of the first planetary gear set (RS1) being connected to a first shaft (W1), a first element of the first planetary gear set (RS1) being connected to a fifth shaft (W5);
    a second planetary gear set (RS2), a third element of the first planetary gear set (RS1) being connected via a fourth shaft (W4) to a second element of the second planetary gear set (RS2);
    a first shifting element (B1), the first shifting element (B1) being a brake, a third element of the second planetary gear set (RS2) being fixable via a second shaft (W2) and the first shifting element (B1);
    a second shifting element (B2), the second shifting element (B2) being a brake, a first element of the second planetary gear set (RS2) being fixable via a third shaft (W3) and the second shifting element (B2);
    a fifth shifting element (K1), the fifth shifting element (K1) being a clutch or a freewheel, the second shaft (W2) being connected to the first shaft (W1) via the fifth shifting element (K1); and a sixth shifting element (K2), the sixth shifting element (K2) being a clutch or a freewheel, the third shaft (W3) being connectable to the fifth shaft (W5) via the sixth shifting element (K2).

19. The bottom bracket gear mechanism of claim 18, further comprising at least one electric machine (EM) connected or connectable to the gear mechanism input shaft (WAn) or the gear mechanism output shaft (WAb).

20. A bicycle or a pedelec (1), comprising the bottom bracket gear mechanism of claim 18.

* * * * *